United States Patent
Burns et al.

(10) Patent No.: US 9,752,473 B1
(45) Date of Patent: Sep. 5, 2017

(54) OIL DRAIN VALVE WITH CHECK BALL AND DETACHABLE BAYONET-STYLE ACTUATOR

(71) Applicants: Michael R. Burns, Katy, TX (US); Jerry L. Burns, Owasso, OK (US)

(72) Inventors: Michael R. Burns, Katy, TX (US); Jerry L. Burns, Owasso, OK (US)

(73) Assignee: VALVOMAX, INC.

( * ) Notice: Subject to any disclaimer, the term of this patent is extended or adjusted under 35 U.S.C. 154(b) by 0 days.

(21) Appl. No.: 15/173,121

(22) Filed: Jun. 3, 2016

Related U.S. Application Data

(60) Provisional application No. 62/170,436, filed on Jun. 3, 2015.

(51) Int. Cl.
| | |
|---|---|
| *F01M 11/04* | (2006.01) |
| *F16L 37/407* | (2006.01) |
| *F16K 15/18* | (2006.01) |
| *F16K 15/04* | (2006.01) |

(52) U.S. Cl.
CPC ....... *F01M 11/0408* (2013.01); *F16K 15/044* (2013.01); *F16K 15/183* (2013.01); *F16L 37/407* (2013.01); *F01M 2011/0425* (2013.01)

(58) Field of Classification Search
CPC ............... F01M 11/04; F01M 11/0408; F01M 2011/0416; F01M 2011/0425; F16K 15/04; F16K 15/044; F16K 15/046; F16K 15/18; F16K 15/183; F16L 29/02; F16L 37/38; F16L 37/40; F16L 37/407; Y10T 137/6881
USPC ............. 251/149.6, 149.7, 144; 184/1.5, 106
See application file for complete search history.

(56) References Cited

U.S. PATENT DOCUMENTS

| | | | | |
|---|---|---|---|---|
| 1,659,047 A | * | 2/1928 | Quinn | F16K 15/044 137/539 |
| 1,989,199 A | * | 1/1935 | Hummert | F16K 15/04 137/533.13 |
| 2,018,769 A | * | 10/1935 | Tryon | F16K 15/04 137/515.7 |
| 2,434,167 A | * | 1/1948 | Knoblauch | F16L 37/23 251/149.6 |

(Continued)

FOREIGN PATENT DOCUMENTS

| | | | | |
|---|---|---|---|---|
| DE | WO 2012031706 A1 | * | 3/2012 | ......... F01M 11/0408 |
| FR | 2370208 A1 | * | 6/1978 | ............. B60R 17/00 |

OTHER PUBLICATIONS

EZ Oil Drain™; https://www.ezoildrainvavle.com; printed Jun. 2, 2016.

(Continued)

*Primary Examiner* — Mary McManmon
*Assistant Examiner* — David Colon Morales

(57) ABSTRACT

An oil change drain valve includes a hollow valve body and a hollow body valve actuator arranged coaxial with the valve body. The valve body is adapted for insertion into an oil pan and houses a check ball and a spring arranged to urge the check ball into a closed position. The valve actuator is adapted for temporary insertion into a lower end of the valve body and includes a bayonet at its upper end. As the valve actuator moves toward the check ball, the bayonet contacts the ball and urges it into an open position. Oil flows through the valve body and actuator unimpeded by any mechanical or moving parts.

8 Claims, 2 Drawing Sheets

(56) References Cited

U.S. PATENT DOCUMENTS

| | | | | |
|---|---|---|---|---|
| 3,103,497 | A | 9/1963 | McCarty et al. | |
| 3,103,947 | A | 9/1963 | Mueller | |
| 3,343,564 | A | 9/1967 | Peeples et al. | |
| 3,538,950 | A * | 11/1970 | Porteners | F16L 37/407 137/879 |
| 3,620,653 | A * | 11/1971 | Gaylord | F04B 53/1002 137/515.5 |
| 3,648,729 | A * | 3/1972 | Balkany | F16K 15/044 137/533.13 |
| 3,720,220 | A * | 3/1973 | McMath | F16K 17/383 137/539 |
| 3,720,287 | A * | 3/1973 | Martel | F01M 11/0458 180/6.5 |
| 3,727,638 | A | 4/1973 | Zaremba, Jr. et al. | |
| 3,743,053 | A | 7/1973 | Kuklewicz | |
| 3,871,483 | A | 3/1975 | Espinosa et al. | |
| 3,967,697 | A | 7/1976 | Guenther | |
| 4,078,763 | A | 3/1978 | Yamamoto | |
| 4,086,981 | A | 5/1978 | Mitsui | |
| 4,150,809 | A | 4/1979 | Muller | |
| 4,193,576 | A * | 3/1980 | White | F16L 37/113 137/322 |
| 4,243,067 | A * | 1/1981 | Rubey | F16K 15/04 137/329.03 |
| 4,269,237 | A | 5/1981 | Berger | |
| 4,314,689 | A | 2/1982 | Wilson | |
| 4,386,639 | A | 6/1983 | Gable et al. | |
| 4,530,421 | A | 7/1985 | Balch | |
| 4,655,251 | A * | 4/1987 | Nimberger | F16K 1/14 137/516.25 |
| 4,700,741 | A * | 10/1987 | Murphy | F16K 15/044 137/539 |
| 4,709,722 | A | 12/1987 | Knapp | |
| 4,728,076 | A * | 3/1988 | Ganshorn | F16L 37/12 251/149.6 |
| 4,745,894 | A | 5/1988 | Laipply et al. | |
| 4,756,349 | A | 7/1988 | Atkins | |
| 4,776,430 | A | 10/1988 | Rule | |
| 4,807,847 | A | 2/1989 | Martz | |
| 4,815,566 | A | 3/1989 | Caruso et al. | |
| 4,869,463 | A * | 9/1989 | Niittyla | F16N 21/00 137/614.03 |
| 4,911,203 | A * | 3/1990 | Garms | F16L 37/096 137/614.04 |
| 4,940,209 | A | 7/1990 | Fish | |
| 4,976,233 | A | 12/1990 | Bedi et al. | |
| 4,977,978 | A | 12/1990 | Batrice | |
| 5,048,578 | A | 9/1991 | Dorf et al. | |
| 5,228,647 | A * | 7/1993 | Ruibal Santome | F16L 29/02 251/149.4 |
| 5,259,588 | A | 11/1993 | Crosby, Jr. et al. | |
| 5,275,200 | A | 1/1994 | Yamamoto | |
| 5,299,777 | A | 4/1994 | Milstead | |
| 5,326,071 | A | 7/1994 | Gunness | |
| 5,385,331 | A * | 1/1995 | Allread | F16L 37/407 251/149.1 |
| 5,407,177 | A | 4/1995 | Lombardo | |
| 5,411,115 | A | 5/1995 | Shropshire | |
| 5,501,397 | A * | 3/1996 | Holt | B05B 7/2486 239/124 |
| 5,546,986 | A | 8/1996 | Clark, II et al. | |
| 5,579,815 | A | 12/1996 | Labonté | |
| 5,630,451 | A | 5/1997 | Bernard | |
| 5,667,195 | A | 9/1997 | McCormick | |
| 5,677,195 | A | 10/1997 | Winkler et al. | |
| 5,765,612 | A | 6/1998 | Morin | |
| 5,967,180 | A | 10/1999 | Yates, III | |
| 5,975,157 | A | 11/1999 | Ashford | |
| 6,126,142 | A | 10/2000 | Wolf et al. | |
| 6,135,150 | A * | 10/2000 | Powell | F16L 29/04 137/614.03 |
| 6,206,344 | B1 * | 3/2001 | Takahara | F01M 11/0408 137/590 |
| 6,837,479 | B2 | 1/2005 | Symonds, Jr. | |
| 6,848,466 | B2 * | 2/2005 | Durand | F16K 1/305 137/15.18 |
| 6,866,122 | B2 * | 3/2005 | Brozovic | F01M 11/0408 184/1.5 |
| 6,902,038 | B2 | 6/2005 | Takahara | |
| 7,168,683 | B2 | 1/2007 | Pliml, Jr. | |
| 8,048,039 | B2 * | 11/2011 | Carlyon | A61M 25/0606 251/149.1 |
| 8,544,606 | B2 | 10/2013 | Covino | |
| 2005/0098384 | A1 * | 5/2005 | Chang | F01M 11/0408 184/1.5 |

OTHER PUBLICATIONS

Fumoto™ Qwik Valve™, http://www.fumotousa.com/about-fumoto-valves.php; printed Jun. 2, 2016.

No-Spill™ valve; https://www.nospillsystems.com/; printed Jun. 2, 2016.

* cited by examiner

OIL DRAIN VALVE WITH CHECK BALL AND DETACHABLE BAYONET-STYLE ACTUATOR

CROSS-REFERENCE

This application claims priority to U.S. 62/170,436 filed Jun. 3, 2015.

BACKGROUND OF THE INVENTION

This invention relates to devices used to plug and drain an oil sump or pan like those typically found in motorized vehicles, lawn and garden equipment, marine and aviation craft, military applications, and oil and gas applications.

Various methods and products have been created for this purpose, but none are simple, leak-proof, and efficient. A valve can remove the hassle of tools, but take a very long time to drain (efficiency concept). Likewise, a valve can prevent stripped threads, but require tools to extract the oil (simplicity concept). And a valve can drain hot oil, but prematurely leak, causing a mess (leak-proof concept). An invention is needed to solve all of these problems: efficiency, simplicity, and leak proof.

A lot of inventors have tried, but all have fallen short. The EZ OIL DRAIN™ valve and FUMOTO™ QWIK VALVE™ incorporate a ball valve connected to a lever that lifts upward and rotates to allow oil flow from the pan through an axial bore of the valve. The valve body extends farther below the oil pan than a standard drain plug, causing a problem for low-clearance vehicles. Moreover, the use of a lever is not advised as it could inadvertently become jarred open during vehicle operation.

The NO-SPILL™ valve includes a spring-loaded piston carrier which pushes open a dual action valve that permits oil flow. Oil must travel around an inner piston carrier which significantly reduces the flow and speed at which oil can be drained.

Other solutions are found in the following U.S. patents:
U.S. Pat. Nos. 3,103,497; 3,343,564; 3,727,638; 3,743,053; 3,871,483; 3,967,697; 4,078,763; 4,086,981; 4,150,809; 4,269,237; 4,314,689; 4,386,639; 4,530,421; 4,709,722; 4,745,894; 4,756,349; 4,776,430; 4,807,847; 4,815,566; 4,940,209; 4,976,233; 4,977,978; 5,048,578; 5,259,588; 5,275,200; 5,299,777; 5,326,071; 5,407,177; 5,411,115; 5,546,986; 5,579,815; 5,630,451; 5,677,195; 5,765,612; 5,967,180; 5,975,157; 6,126,142; 6,837,479; 6,902,038; 7,168,683; 8,544,606.

U.S. Pat. No. 4,709,722 discloses a spring-loaded check valve which is opened by vacuum provided by an external pump. U.S. Pat. No. 4,940,209 discloses a ball-type check valve inserted into the oil sump and activated by a lever affixed to a pipe which is screwed onto the check valve fitting. U.S. Pat. No. 5,630,451 discloses an insert for an oil sump which incorporates a plug valve. U.S. Pat. No. 6,126,142 incorporates a combination tool with a polygonal head to remove a drain plug and insert into a hollow bore for emptying the sump. While the patents disclose a variety of different systems, methods, and techniques to drain oil—with some being more effective than others—none offer a simple, leak-proof, efficient design.

Some prior art designs only provide a valve, without the tubing. This only partially solves the problem associated with conventional drain plugs because oil splatter still exists. Other designs provide the valve and tubing, but the valve protrudes too far from the oil pan, causing an issue with low-clearance vehicles. Still other products provide a valve and tubing but the valve actuating device prematurely releases oil flow and causes a mess. Designs that include a check ball require a pump or tool to extract oil or include internal mechanics which impede the free drain of oil, slowing the time for this task.

SUMMARY OF THE INVENTION

Preferred embodiments of a drain fitting (or valve) made according to this invention include a valve body housing a check valve, a detachable actuator to actuate the valve, and a vinyl tubing to direct the flow of draining oil. The drain fitting replaces the standard drain plug and permits flow of oil through an axially hollow bore of the valve body and actuator.

The valve operates by use of a spring-loaded check ball which is unseated and moved to an open position by means of the detachable valve actuator. The valve actuator is preferably a bayonet-style actuator with a tipped member that pushes on the check ball. The actuator itself is seated inside an internally-threaded tap nut. As the tap nut is threaded onto the valve assembly the actuator unseats the spring-loaded check ball from its normally closed position, thereby releasing the flow of oil.

In a preferred embodiment, the oil change drain valve includes a hollow valve body adapted for insertion into an oil pan and housing a check ball and a spring arranged to urge the check ball into a closed position; and a hollow body valve actuator adapted for temporary insertion into a lower end of the valve body and including a bayonet at one end arranged to urge the check ball into an open position as the valve actuator moves between a retracted (first) and an advanced (second) position relative to the valve body and its check ball. The valve does not require a lever for activation, nor does it require an internal piston assembly, extraction tool, or other obstruction that impedes the flow of oil through the valve.

An objective of the invention is to provide a simple, leak-proof, efficient solution to safely and cleanly drain used engine oil from an oil pan or reservoir.

ELEMENTS USED IN THE DRAWINGS AND DETAILED DESCRIPTION

Figure 1:
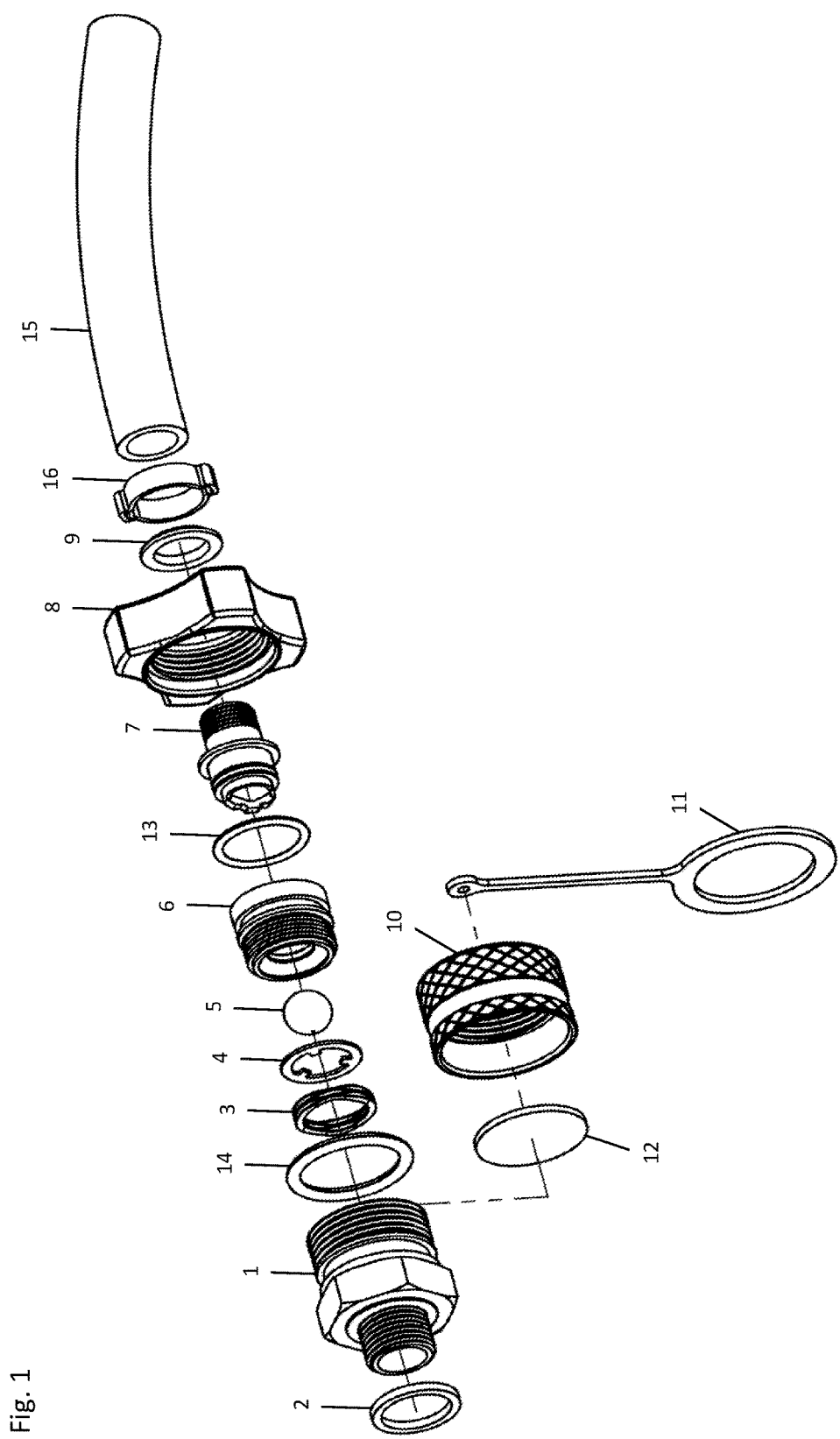
FIG. 1 is an exploded assembly view of a preferred embodiment of the oil drain valve.
Figure 2:
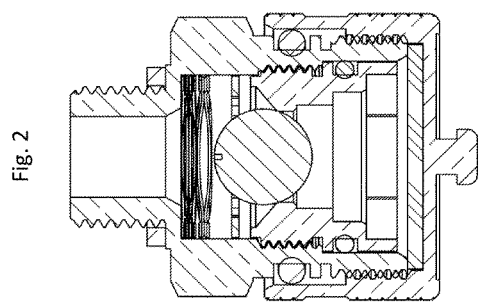
FIG. 2 is a cross-section view of the oil drain valve of FIG. 1 in its normal, closed state. A spring pushes the check ball against its cavity and does not allow any leakage.
Figure 3:
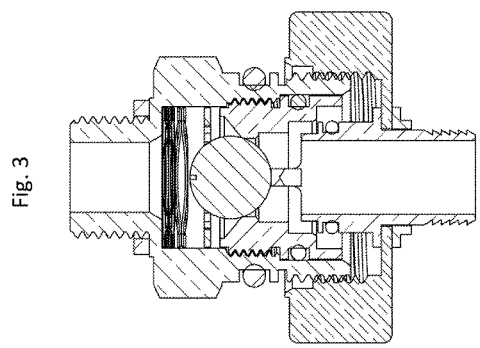
FIG. 3 is a cross-section view of the oil drain valve of FIG. 1 when threaded into an oil drain pan and showing a detachable valve actuator being threaded onto the valve body.
Figure 4:
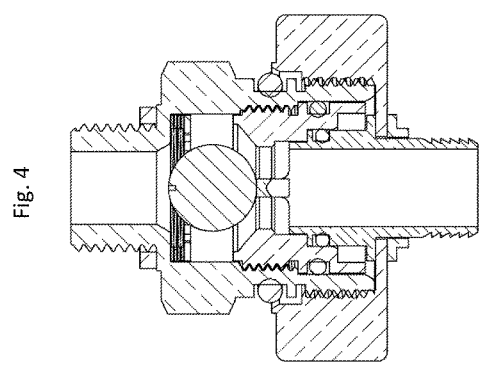
FIG. 4 is a cross-section view taken of the oil drain valve of FIG. 1. showing the detachable valve actuator fully threaded onto the valve body and urging the check ball upward.

1 Valve body with axial hollow bore
2 Washer
3 Spring means (e.g. compression spring, wave spring, or their equivalent)
4 Location washer
5 Internal check ball 6 Valve body insert
7 Bayonet (with axial hollow bore)
8 Bayonet tap nut
9 Bayonet tap sleeve
10 Dust cap
11 Tether
12 Dust cap seal
13 Small O-ring
14 Large O-ring
15 Tubing
16 Tubing clamp

DETAILED DESCRIPTION OF THE PREFERRED EMBODIMENTS

An oil pan drain valve made according to this invention provides a simple, leak-proof, efficient oil plug which permanently replaces the drain plug and facilitates a mess-free oil change.

Referring to the drawing figures, a preferred embodiment of the drain valve includes a valve body 1 connected to the oil pan at one end and a detachable valve actuator 7, 8, 9 at the other end. The drain valve can be made of a high-quality brass, metal, or chemical and heat resistant plastics.

In the ordinary task of changing engine oil, a user would remove a dust cap 10 located at the lowermost end of the valve body 1, insert the bayonet 7 of the detachable valve actuator into the now-exposed lowermost end of the valve body 1, and thread a tap nut 8 of the valve actuator clock-wise until the uppermost end of the bayonet 7 unseats the check ball 5 thereby releasing the oil through the valve body 1 and bayonet 7. Once the oil pan has been drained, the user would reverse the steps and re-fill the crank case with new engine oil.

The drain valve includes a valve body 1 which is threadably connected to the oil pan plug opening. A washer 2 seals the valve body 1 to the oil pan. The valve body 1 includes a chamber or insert 6 housing an internal check ball 5 and spring means such as a compression spring or a wave spring 3. The use of the wave spring 3 and insert 6 is preferred because it permits the oil to flow faster through the valve body 1 than does a compression spring only design. On the lowermost end of the valve body 1, a rubber tether 11 holds a dust cap 10. An outside seal 12 seals the cap 10.

The check ball 5 is actuated by a bayonet 7 which is seated inside the bayonet tap nut 8. The tap nut 8 is threadably connected to the valve body 1. As the tap nut 8 is threaded onto the valve body 1, a bayonet tip engages with the check ball 5, unseating the ball 5 and thrusting it upward against the spring 3. As the check ball 5 is unseated, oil is permitted to flow through the valve and into tubing 15. A bayonet tap sleeve 9 allows the tap nut 8 to rotate freely without causing a kink in the tubing 15.

The advantages of the drain valve over the prior art are numerous. First, the valve body does not protrude any further from the oil pan than the drain plug itself freeing the vehicle operator from concern the valve could be dislodged from a road obstacle. Second, the drain valve includes both a valve and drain tube as part of a completely enclosed system. The user avoids a mess and skin contact. Third, the current design is efficient because there is no inner piston assembly, extraction tool, or other obstruction that impedes freely flowing oil. Fourth, the design is simple, only involving two assembled components: the valve body and the valve actuator with connected drain tubing. Fifth, and last, drain valve does not include a lever which could become accidently jarred open during vehicle operation.

What is claimed:

1. An oil change drain valve comprising:
a valve body arranged for insertion into an oil pan drain opening, the valve body including an external threaded length and a hollow axial bore with an exposed open uppermost end, the hollow axial bore housing a check ball at another end and a wave spring located toward the exposed open uppermost end, the spring trapped by the valve body and arranged to urge the check ball into a closed position within the hollow axial bore; and
a valve actuator arranged for temporary insertion into the hollow axial bore of the valve body, the valve actuator including a hollow axial bore arranged coaxial to the exposed open uppermost end of the valve body, a bayonet nut arranged to thread onto the external threaded length of the valve body, and a bayonet residing within the bayonet nut, the bayonet arranged to move between a first and a second position relative to the check ball as the bayonet nut threads along the external threaded length of the valve body, the bayonet remains in an unchanged position relative to the bayonet nut during travel, wherein when in the second position the bayonet urges the check ball toward a fully open position, a total length of travel of the bayonet being a same amount as the external threaded length; and
a location washer housed within the hollow axial bore of the valve body arranged to position the check ball, wherein the location washer is a flat internal-toothed thrust washer; and
a threaded removable valve body insert arranged for connection to the hollow axial bore of the valve body, the insert has an inner circular radius for a valve seat, and an outer portion containing an O-Ring and O-Ring groove.

2. An oil change drain valve according to claim 1 further comprising a tubing located at a lower end of the valve actuator and arranged coaxial with the hollow axial bore of the valve actuator.

3. A method of draining engine oil, the method comprising:
removing a dust cap from a lower end of a valve body, the valve body including an external threaded length and a hollow axial bore with an exposed open uppermost end, the hollow axial bore housing a check ball at another end and a wave spring and a location washer located toward the exposed open uppermost end, wherein the location washer is a flat internal-toothed thrust washer, the wave spring trapped by the valve body, and a threaded removable insert on the downmost end, the insert containing an inner valve seat and outer O-Ring and O-Ring groove;
inserting a valve actuator onto the lower end of the valve body, the valve actuator arranged for temporary insertion into the hollow axial bore of the valve body, the valve actuator including a hollow axial bore arranged coaxial to the exposed open uppermost end of the valve body, a bayonet nut arranged to thread onto the threaded length, and a bayonet residing within the bayonet nut;
moving the valve actuator between a first and a second position, the bayonet remaining in an unchanged position relative to the bayonet nut during travel, the check ball being urged by the bayonet toward an open position when the valve actuator moves into the second position; and allowing oil to drain through the hollow axial bores of the valve body and the valve actuator.

4. A method according to claim 3 further comprising the steps of:

removing the valve actuator from the lower end of the valve body; and reinstalling the dust cap.

5. An oil change drain valve comprising:

a valve body arranged for insertion into an oil pan drain opening, the valve body including external threads, a hollow axial bore with an exposed open uppermost end, and a wave spring and a location washer trapped by the valve body, wherein the location washer is a flat, internal-toothed thrust washer, the hollow axial bore housing a check ball, the wave spring arranged to urge the check ball into a closed position within the hollow axial bore, and a threaded removable insert on a downmost end of the valve body, the insert containing an inner valve seat and an outer O-Ring and O-Ring groove; and a valve actuator including a hollow axial bore arranged coaxial to the exposed open uppermost end of the valve body and a valve actuator nut arranged to thread onto the external threads of the valve body.

6. An oil change drain valve according to claim 5 further comprising the valve actuator including at least one bayonet projection located at an uppermost end of the hollow axial bore of the valve actuator.

7. An oil change drain valve according to claim 5 further comprising a total length of travel of the valve actuator limited by a total length of the external threads.

8. An oil change drain valve according to claim 5 further comprising a tubing located at a lower end of the valve actuator and arranged coaxial with the hollow axial bore of the valve actuator.

* * * * *